(12) United States Patent
Yoneda et al.

(10) Patent No.: US 9,496,096 B2
(45) Date of Patent: Nov. 15, 2016

(54) CAPACITOR

(71) Applicant: NICHICON CORPORATION, Kyoto-shi (JP)

(72) Inventors: Mitsuru Yoneda, Kyoto (JP); Naoya Maruyama, Kyoto (JP)

(73) Assignee: NICHICON CORPORATION, Kyoto (JP)

( * ) Notice: Subject to any disclaimer, the term of this patent is extended or adjusted under 35 U.S.C. 154(b) by 214 days.

(21) Appl. No.: 14/366,028

(22) PCT Filed: Dec. 18, 2012

(86) PCT No.: PCT/JP2012/082721
§ 371 (c)(1),
(2) Date: Jun. 17, 2014

(87) PCT Pub. No.: WO2013/099686
PCT Pub. Date: Jul. 4, 2013

(65) Prior Publication Data
US 2015/0325383 A1 Nov. 12, 2015

(30) Foreign Application Priority Data
Dec. 27, 2011 (JP) .................... 2011-287023

(51) Int. Cl.
*H01G 9/08* (2006.01)
*H01G 2/10* (2006.01)
(Continued)

(52) U.S. Cl.
CPC ............ *H01G 11/14* (2013.01); *H01G 9/035* (2013.01); *H01G 9/048* (2013.01); *H01G 9/10* (2013.01);
(Continued)

(58) Field of Classification Search
CPC ....................................... H01G 9/12
(Continued)

(56) References Cited

U.S. PATENT DOCUMENTS

| 4,484,691 A | 11/1984 | Lees |
| 4,617,611 A | 10/1986 | Miura |
| 6,031,713 A * | 2/2000 | Takeishi ............ H01G 9/08 361/517 |

FOREIGN PATENT DOCUMENTS

| DE | 3642575 | 6/1988 |
| EP | 0354607 | 2/1990 |

(Continued)

OTHER PUBLICATIONS

The Extended European Search Report, European Patent Office, Oct. 7, 2015, EP application 12863539.8.

*Primary Examiner* — Eric Thomas
(74) *Attorney, Agent, or Firm* — Lex IP Meister, PLLC

(57) ABSTRACT

The present application provides a capacitor in which the operability of the pressure valve, and valve deformation during operation, can be stabilized. A capacitor (1) comprising: a capacitor element (6) obtained by overlapping and winding a positive electrode foil (8) and a negative electrode foil (7) with an electrolytic paper (9) interposed therebetween, and impregnating the foils with an electrolytic solution; a bottomed cylindrical outer case (4) for housing the capacitor element (6); and a sealing body (2) for sealing the opening of the outer case (4). The inner bottom part of the outer case (4) has formed thereon a recess (21) having: a first inclined surface (22) spreading in a radial manner from the center region of the inner bottom part, the center region being the deepest part; and a second inclined surface (23) which is continuous from the outer edge of the first inclined surface (22) and which is steeper than the first inclined surface (22). A weakened section is formed in the recess, and (Continued)

a groove is formed on the outside of the inner bottom part of the outer case.

16 Claims, 8 Drawing Sheets

(51) Int. Cl.
| | |
|---|---|
| *H01G 11/14* | (2013.01) |
| *H01G 9/145* | (2006.01) |
| *H01G 11/58* | (2013.01) |
| *H01G 11/52* | (2013.01) |
| *H01G 11/26* | (2013.01) |
| *H01G 9/048* | (2006.01) |
| *H01G 9/10* | (2006.01) |
| *H01G 9/035* | (2006.01) |
| *H01G 9/12* | (2006.01) |
| *H01G 11/18* | (2013.01) |
| *H01G 11/78* | (2013.01) |
| *H01G 11/80* | (2013.01) |

(52) U.S. Cl.
CPC .............. *H01G 9/12* (2013.01); *H01G 9/145* (2013.01); *H01G 11/18* (2013.01); *H01G 11/26* (2013.01); *H01G 11/52* (2013.01); *H01G 11/58* (2013.01); *H01G 11/78* (2013.01); *H01G 11/80* (2013.01); *Y02E 60/13* (2013.01)

(58) Field of Classification Search
USPC .......................................................... 361/517
See application file for complete search history.

(56) References Cited

FOREIGN PATENT DOCUMENTS

| | | |
|---|---|---|
| JP | 1-65127 | 4/1989 |
| JP | H0165127 | 4/1989 |
| JP | 10-022180 | 1/1998 |
| JP | 2001307967 | 11/2001 |
| JP | 2010-092913 | 4/2010 |
| KR | 1020060118958 | 11/2006 |

* cited by examiner (a)

(b)

(a)

(b)

(c)

CAPACITOR

TECHNICAL FIELD

The present invention relates to a capacitor and, more particularly, to a capacitor which contains an electrolytic solution inside of its exterior case.

BACKGROUND ART

As a capacitor which contains an electrolytic solution inside of its exterior case, there are an electrolytic capacitor and an electric double-layer capacitor.

In the electrolytic capacitor, metal referred to as a valve metal such as aluminum, tantalum and niobium is used for its electrodes, an anode of the electrodes is oxidized, and the resultant which is an oxide film layer is used as a dielectric.

In the electric double-layer capacitor, a phenomenon (an electric double-layer) in which charges are arrayed at extremely short distances in interfaces between electrodes (polarized electrodes) and an electrolytic solution is utilized.

In a method of manufacturing an aluminum electrolytic capacitor in which aluminum is used for its electrodes, etching processing and oxide film formation processing are performed, an anode foil and a cathode foil to which electrode lead-out terminals are respectively attached are wound via separators, and the resultant is fixed by an element stopper tape, thereby forming a capacitor element. This capacitor element is impregnated with an electrolytic solution for driving and thereafter, is housed in an exterior case having a cylindrical shape with a bottom. There may be a case where the capacitor element is fixed inside of the case by using a fixation material.

Further, an opening sealing body is attached to an opening of the exterior case, and the opening has a configuration which is sealed through drawing processing.

In an aluminum electrolytic capacitor whose terminal shape is substrate-self-supporting-type, a positive electrode terminal and a negative electrode terminal are formed on an external end face of the opening sealing body, and a positive electrode tab terminal and a negative electrode tab terminal led out from the capacitor element are electrically connected to end portions of these terminals. In addition, in an aluminum electrolytic capacitor whose terminal shape is lead-wire type, lead terminals electrically connected to a positive electrode tab terminal and a negative electrode tab terminal which are led out from a capacitor element are led out externally through an insertion hole provided in an opening sealing body.

A capacitor element of the electric double-layer capacitor in which polarized electrode layers are formed on current collectors formed of a metal foil such as an aluminum foil is obtained by winding an anode foil and a cathode foil to which electrode lead-out terminals are attached via separators. In the electric double-layer capacitor, the capacitor element mentioned above is impregnated with an electrolytic solution and is housed in a case formed of aluminum or the like and having a cylindrical shape with a bottom. As described above, the electric double-layer capacitor and the aluminum electrolytic capacitor are different from each other only in configurations of the electrodes and have the same configurations.

When an abnormal stress such as an overvoltage and an excessive ripple current is applied to each of the above-described capacitors containing the electrolytic solution thereinside, the electrolytic solution is decomposed and a gas is generated. When this generation of the gas increases an internal pressure of the capacitor, the capacitor is ruptured. Therefore, a weak portion is provided at a bottom portion of the exterior case having the cylindrical shape with the bottom and is caused to function as a safety device (pressure valve) operating in accordance with an increase in the internal pressure to release the internal pressure externally.

A pressure at which this pressure valve operates can be set to a desired pressure by adjusting a thickness of the weak portion. However, the higher the pressure at which the pressure valve operates is, the larger a range in which the valve is opened is, thereby leading to a problem in that the bottom portion of the exterior case after opening the valve is largely deformed. Therefore, there proposed is the technology in which a thick-wall portion formed so as to be thicker than a side wall portion is formed in a bottom of the exterior case, a thin-wall portion is formed within a range of this thick-wall portion, and linear grooves serving as the weak portion are further formed in the thin-wall portion, thereby limiting to the thin-wall portion the range in which the valve is opened (refer to Patent Literature 1).

PRIOR ART LITERATURE PATENT LITERATURE

Patent Literature 1: JP2001-307967A

SUMMARY OF THE INVENTION

Technical Problem

However, in the conventional safety device, since the weak portion, formed inside of the bottom of the exterior case, and an inside of the case of the thin-wall portion are formed substantially in parallel with each other, a pressure exerted in accordance with an increase in the internal pressure is applied to the whole of the weak portion and the thin-wall portion is also largely deformed. Therefore, in view of devising of a reduction in a height of the deformation of the bottom of the exterior case, the conventional safety device is still insufficient.

In order to solve the above-described problem, the present invention was made. An object of the present invention is to provide a capacitor capable of stabilizing operativeness of a pressure valve and the deformation of the pressure valve upon the operation.

Solution to Problem

The present invention relates to a capacitor which includes: a capacitor element being formed by overlaying and winding a anode foil and a cathode foil with a separator interposed between the anode foil and the cathode foil and by being impregnated with an electrolytic solution; an exterior case for housing the capacitor element, the exterior case having a cylindrical shape with a bottom; and an opening sealing body for sealing an opening of the exterior case. In the capacitor, a recessed part is formed on an inner bottom of the exterior case, the recessed part having: a first inclined surface radially expanding from a central part area of the inner bottom, the central part area of the inner bottom being the deepest portion of the inner bottom; and a second inclined surface continuing to an outer edge of the first inclined surface, the second inclined surface being steeper than the first inclined surface, a weak portion is formed inside of the recessed part, and a groove part is formed outside of the inner bottom of the exterior case.

By employing this configuration, the recessed part constituted of the first inclined surface and the second inclined surface is provided in the inner bottom of the exterior case, thereby allowing a starting point of the deformation of the bottom of the exterior case caused in accordance with an increase in an internal pressure of the exterior case to be set only in the recessed part, instead of being in the whole of the inner bottom. Thus, upon deforming the bottom in accordance with the increase in the internal pressure, an amount of deformation of the bottom can be suppressed and a height of deformation can be reduced. In addition, the starting point of the deformation is set only in the recessed part, thereby allowing the deformation at a desired internal pressure to be stabilized.

In addition, in the capacitor of the present invention, in the deepest portion, a flat part having a diameter within a range of 3% to 28% of an internal diameter of the exterior case is provided.

In addition, in the capacitor of the present invention, an inclination angle of the first inclined surface is an angle within a range of 0.5° to 2.0° with respect to a horizontal plane on which the inner bottom is arranged.

In addition, in the capacitor of the present invention, a length of an edge portion of the inner bottom of the exterior case is a length within a range of 11% to 29% of a diameter of the exterior case.

In addition, in the capacitor of the present invention, a thickness of a thick-wall portion of the inner bottom of the exterior case is a thickness within a range of 0.5 mm to 1.0 mm.

By employing the above-described configuration, variation in a working pressure and an amount of deformation can be reduced.

Advantageous Effects of the Invention

According to the present invention, a capacitor is capable of stabilizing operativeness of a pressure valve and the deformation of the pressure valve upon the operation.

DESCRIPTION OF EMBODIMENTS

Hereinafter, an embodiment of the present invention will be described with reference to the accompanying drawings.

Figure 1:
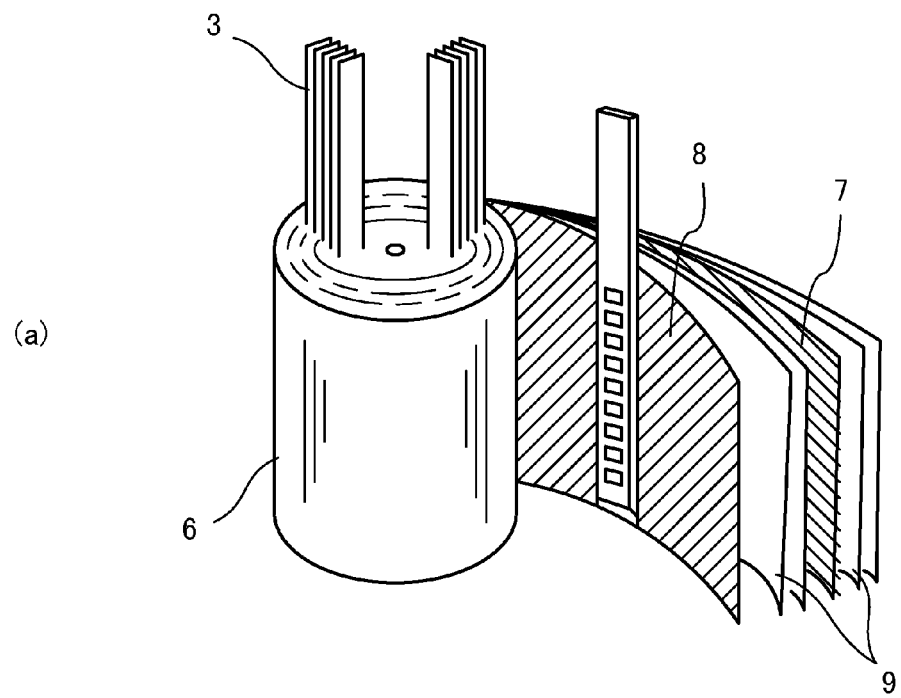
FIG. 1 (a) is a perspective view illustrating a configuration of a capacitor according to the present invention and FIG. 1 (b) is a partial cross-sectional view illustrating the configuration of the capacitor according to the present invention.
Figure 1:
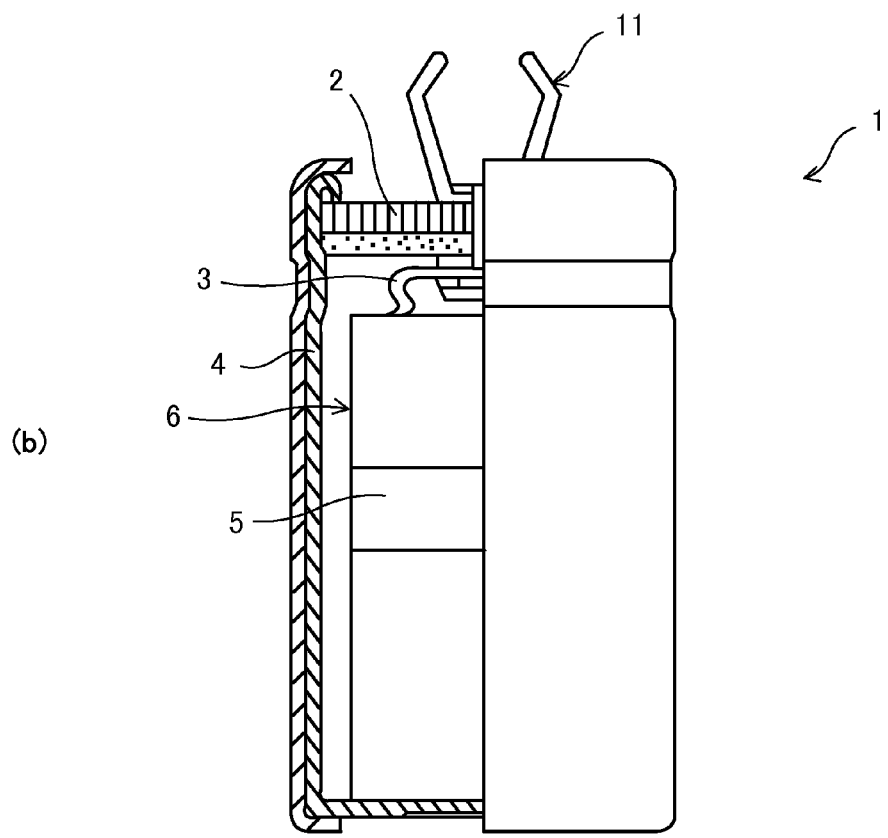

As shown in FIG. 1 (a) and FIG. 1 (b), in a capacitor 1 according to the present embodiment, a capacitor element 6 is configured such that an anode foil 8 and a cathode foil 7 which are formed of a valve metal are overlaid and wound with electrolytic papers 9 as separators interposed therebetween and a winding stopper tape 5 is attached at an winding end portion. Further, this capacitor element 6 is impregnated with an electrolytic solution for driving not shown.

A metal case 4 which is an exterior case is a metal case which has a cylindrical shape with a bottom and is to house the above-mentioned capacitor element 6. An opening sealing terminal plate 2 which is an opening sealing body includes a pair of terminals 11 to which lead tabs 3 for external leading-out, led out from the above-described capacitor element 6, are connected.

The opening sealing terminal plate 2 is provided in an opening of the metal case 4 by curling an open end of the metal case 4 for tight sealing and is configured to thereby ensure airtightness of the capacitor.

Figure 2:
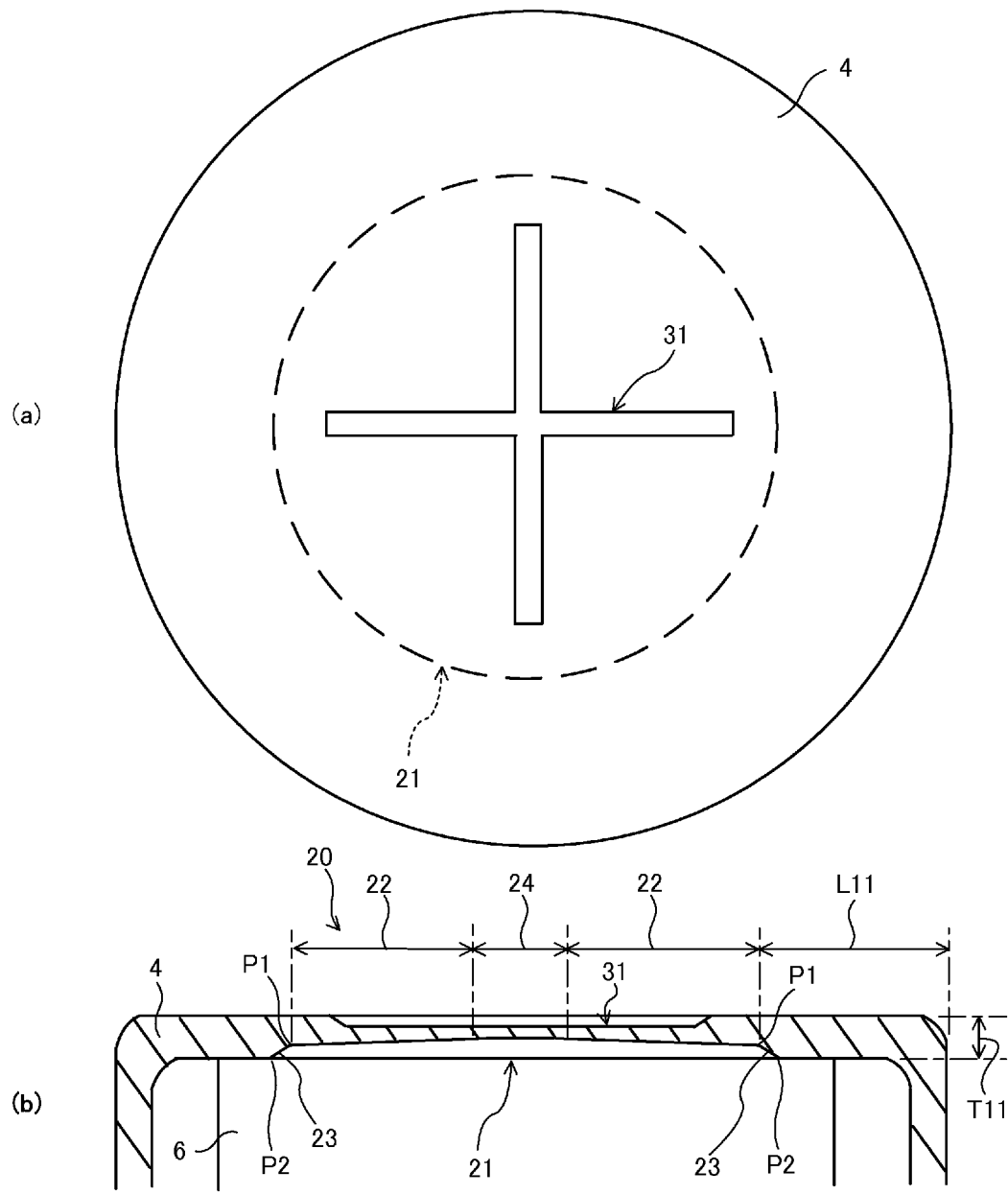
FIG. 2 (a) is a plan view showing the configuration of the capacitor according to the present invention and FIG. 2 (b) is an enlarged cross-sectional view illustrating the configuration of the capacitor according to the present invention.

As shown in FIG. 2 (a) and FIG. 2 (b), on a bottom of the metal case 4, a pressure valve 20 is provided. The pressure valve 20 is constituted of: a recessed part 21 which is formed on an inner bottom of the metal case 4 and has a circular-shaped planar view; and a cruciform groove part 31 which is formed on an external face side of the bottom of the metal case 4.

As shown in FIG. 2 (a), the recessed part 21 is formed in a recessed manner on the inner bottom of the metal case 4 so as to have the substantially circular-shaped planer view having a predetermined diameter. As shown in FIG. 2 (b), the recessed part 21 is formed by an inclined surface having two inflection points P1 and P2 on a periphery thereof. Specifically, on the inner bottom of the metal case 4, the recessed part 21 is formed by a first inclined surface 22 radially expanding from the flat part 24 having the substantially circular-shaped planar view, formed in a central part area (the deepest portion of the inner bottom) and a second inclined surface 23 continuing to an outer edge of the first inclined surface 22. The first inflection point P1 forms an outer edge of the first inclined surface 22 and constitutes a boundary between a gentle inclination of the first inclined surface 22 and a steeper inclination of the second inclined surface 23 than the gentle inclination of the first inclined surface 22. The second inflection points P2 constitutes an outer edge of the second inclined surface 23. A step part constituted of the steep second inclined surface 23 is formed by the first inflection points P1 and the second inflection points P2.

In the present invention, the first inclined surface 22 is not limited to a flat surface and may be an inclined surface having a curved surface whose degree of the inclination becomes gentle gradually from the first inflection point P1 toward the central part area (flat part 24) of the inner bottom.

A diameter of the flat part 24 provided in the central part area of the inner bottom is in a range of 3% to 28% of an internal diameter of the metal case 4.

By setting the diameter to be in the range of 3 to 28%, in addition to the effects attained by the configuration including the recessed part 21 which has the weak portion thereinside (effects that an amount of deformation of the bottom of the metal case 4 caused by an increase in the internal pressure of the metal case 4 can be suppressed and that a height of the deformation can be reduced), effects that the variation in a working pressure and an amount of deformation can be reduced and that a sufficient length of the second inclined surface 23 which is an important factor in the present invention can be obtained.

In addition, an inclination angle of the first inclined surface 22 with respect to a horizontal plane (horizontal plane on which the inner bottom is arranged) in FIG. 2 (b), which is in a range of 0.5° to 2.0°, is appropriate. By setting the inclination angle thereof to be in the range of 0.5° to 2.0°, a sufficient angle of the first inclined surface 22 which is an important factor in the present invention can be obtained. Furthermore, in addition to the effects attained by the configuration including the recessed part 21 which has the weak portion thereinside (effects that the amount of deformation of the bottom of the metal case 4 caused by the increase in the internal pressure of the metal case 4 can be suppressed and that the height of the deformation can be reduced), the effect that the variation in the working pressure and the amount of deformation can be reduced can be attained.

In addition, a length L11 of an edge portion of the inner bottom of the metal case 4 which is in a range of 11% to 29% of a diameter of the metal case 4 is appropriate. By setting the length L11 to be in the range of 11% to 29%, since a sufficient length of the thick-wall portion of the bottom can be ensured, an effect to suppress the expansion of the valve can be attained. Furthermore, in addition to the effects attained by the configuration including the recessed part 21 which has the weak portion thereinside (effects that the amount of deformation of the bottom of the metal case 4 caused by the increase in the internal pressure of the metal case 4 can be suppressed and that the height of the deformation can be reduced), the effect that the variation in the working pressure and the amount of deformation can be reduced can be attained.

In addition, regardless of a size of the metal case 4, a thickness T11 of the thick-wall portion of the inner bottom of the metal case 4 which is in a range of 0.5 mm to 1.0 mm is appropriate. By setting the thickness T11 to be in the range of 0.5 mm to 1.0 mm, since a sufficient thickness of the thick-wall portion of the bottom can be ensured, the effect to suppress the expansion of the valve can be attained. Furthermore, in addition to the effects attained by the configuration including the recessed part 21 which has the weak portion thereinside (effects that the amount of deformation of the bottom of the metal case 4 caused by the increase in the internal pressure of the metal case 4 can be suppressed and that the height of the deformation can be reduced), the effect that the variation in the working pressure and the amount of deformation can be reduced can be attained.

Figure 3:
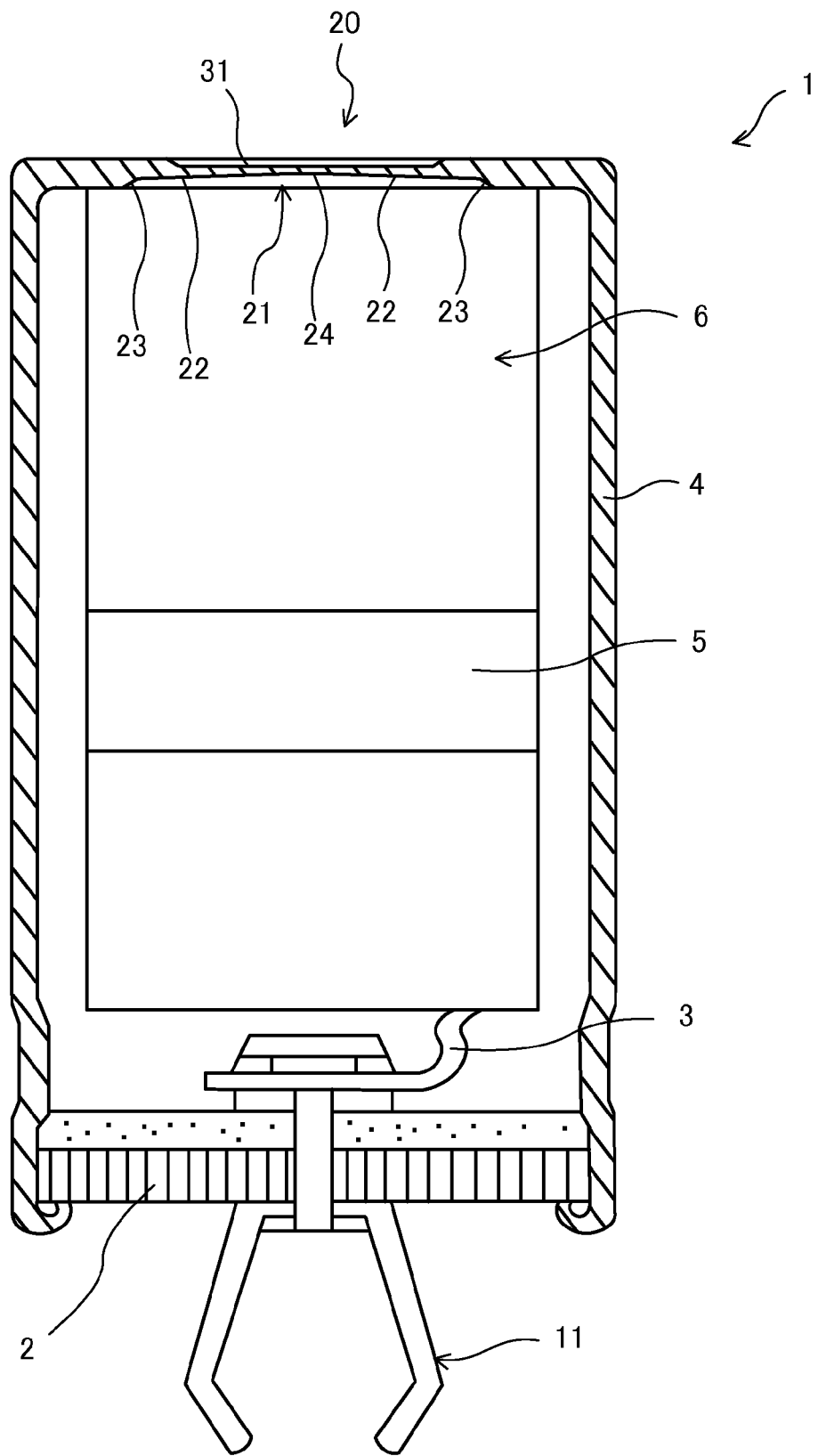
FIG. 3 is a cross-sectional view illustrating a state of the capacitor according to the present invention before operating a valve.
Figure 4:
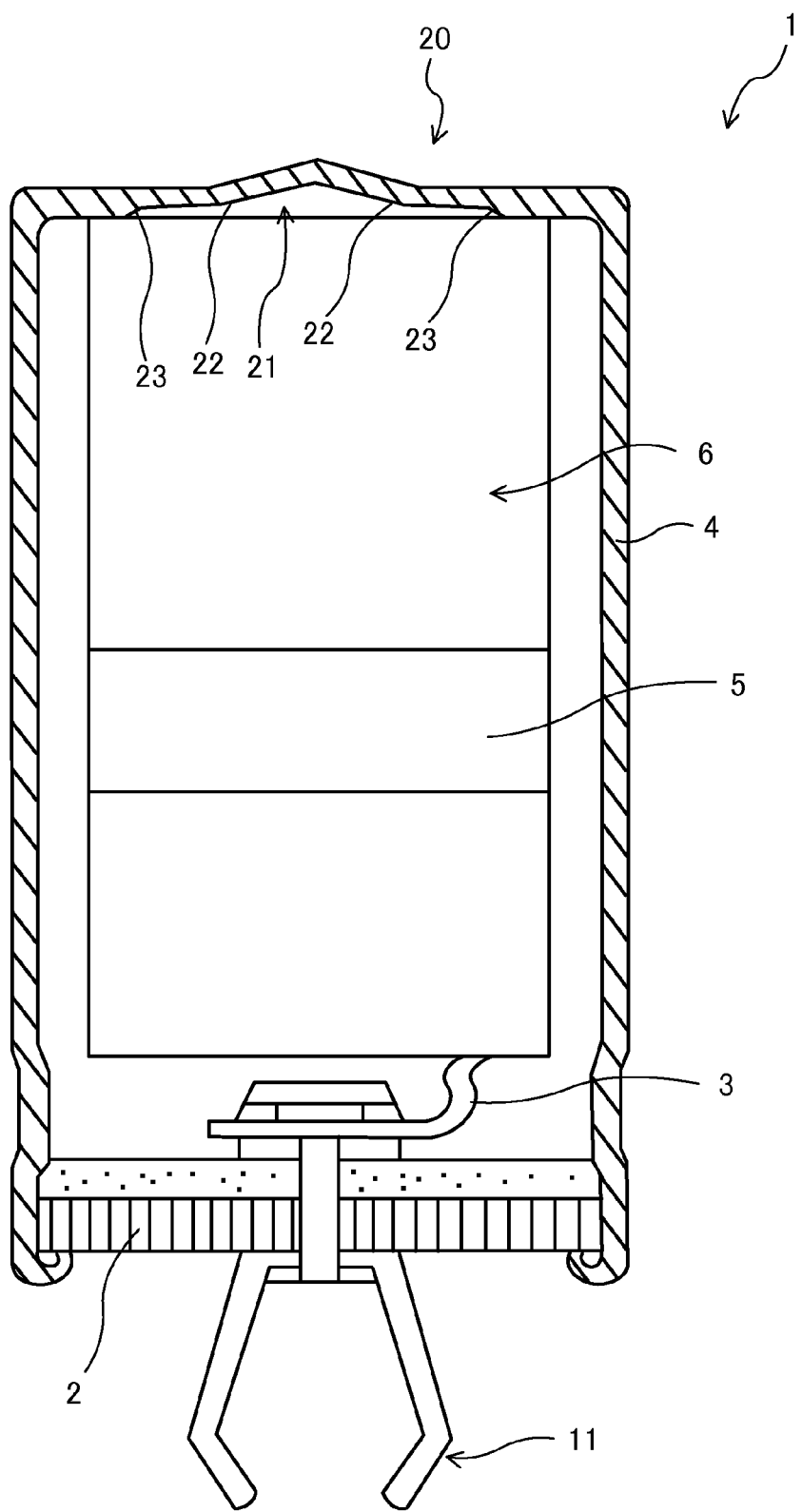
FIG. 4 is a cross-sectional view illustrating a state of the capacitor according to the present invention after operating the valve.

As described above, in the present embodiment, as the recessed part 21 of the pressure valve 20, the configuration having the steeply inclined surface (steep second inclined surface 23 having the step portion) and the gently inclined surface (first inclined surface 22) expanding toward the central part area of the inner bottom is employed (FIG. 3). Thus, a starting point of the deformation of the bottom of the metal case 4 caused in accordance with the increase in the internal pressure of the metal case 4 can be set to be only in the recessed part 21, instead of being in the whole of the inner bottom, thereby allowing a deformation state to be controlled so as to be substantially constant (FIG. 4).

Figure 5:
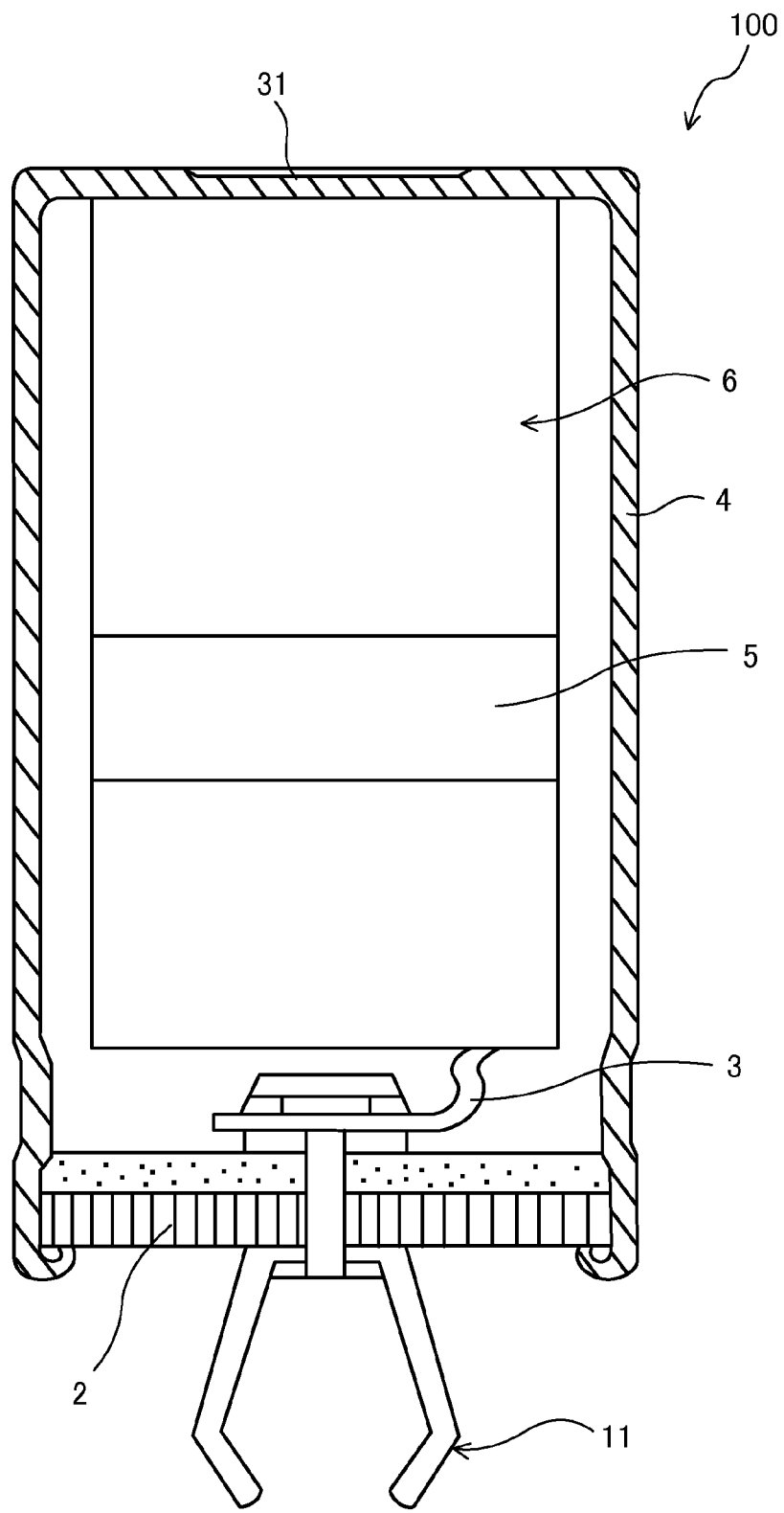
FIG. 5 is a cross-sectional view illustrating a state of the conventional capacitor before operating a valve.
Figure 6:
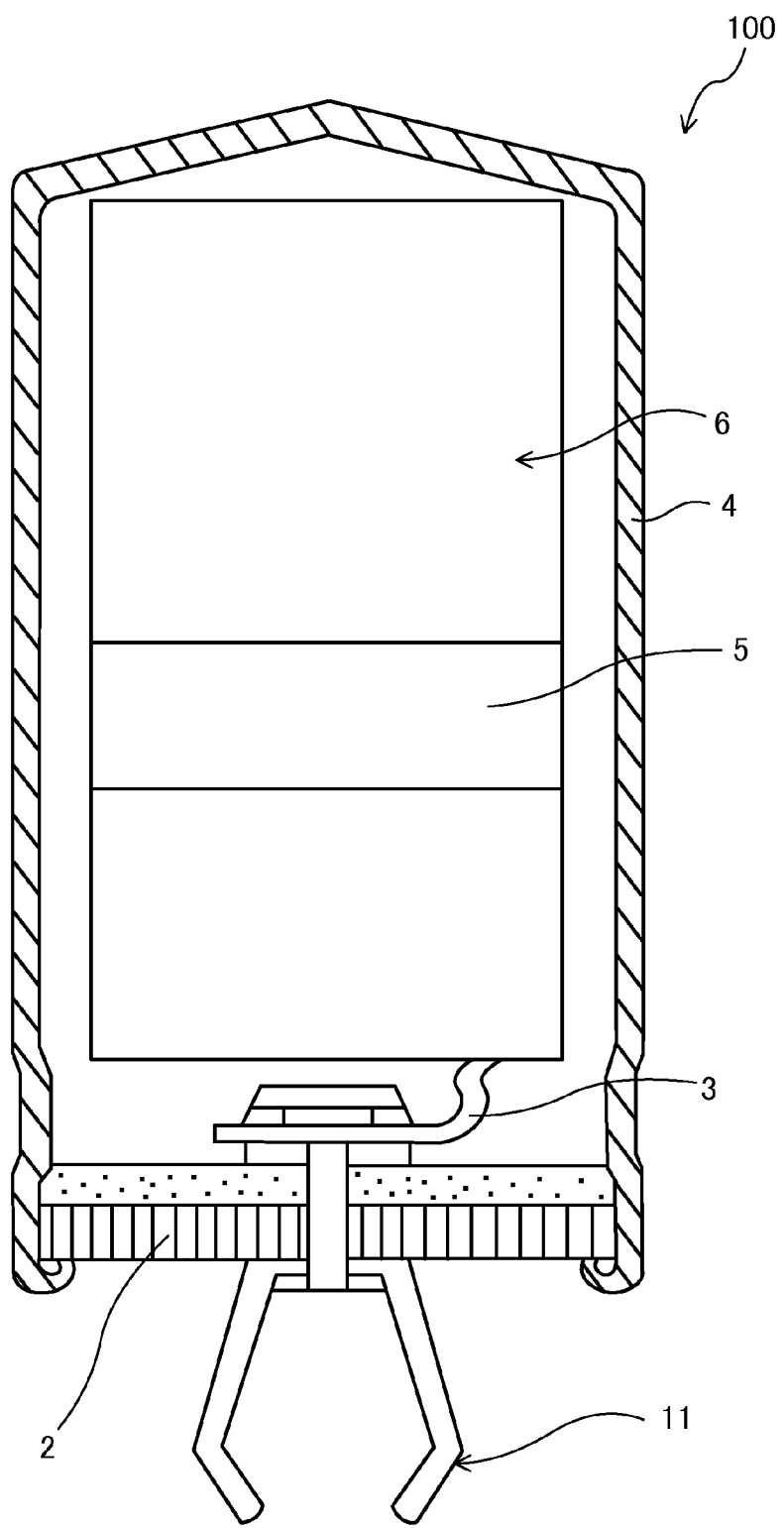
FIG. 6 is a cross-sectional view illustrating a state of the conventional capacitor after operating the valve.

In this respect, in the conventional capacitor 100 (FIG. 5), in a bottom of a metal case 4, the recessed part 21 having the two inclined surfaces (the first inclined surface 22 and the second inclined surface 23) as in the present embodiment is not provided. Therefore, a starting point of the deformation of the metal case 4 caused in accordance with the increase in the internal pressure of the metal case 4 is set to be in the whole of the bottom (FIG. 6), thereby leading to a problem in that a height of the deformation of the bottom is increased. However, in the capacitor 1 (FIG. 3 and FIG. 4) according to the present embodiment, this problem is remedied and the amount of deformation upon opening the pressure valve 20 is suppressed, thereby allowing the height of the deformation to be reduced.

In addition, the starting point of the deformation can be set to be only in the recessed part 21, thereby allowing operativeness at a desired valve working pressure to be stabilized.

Figure 7:
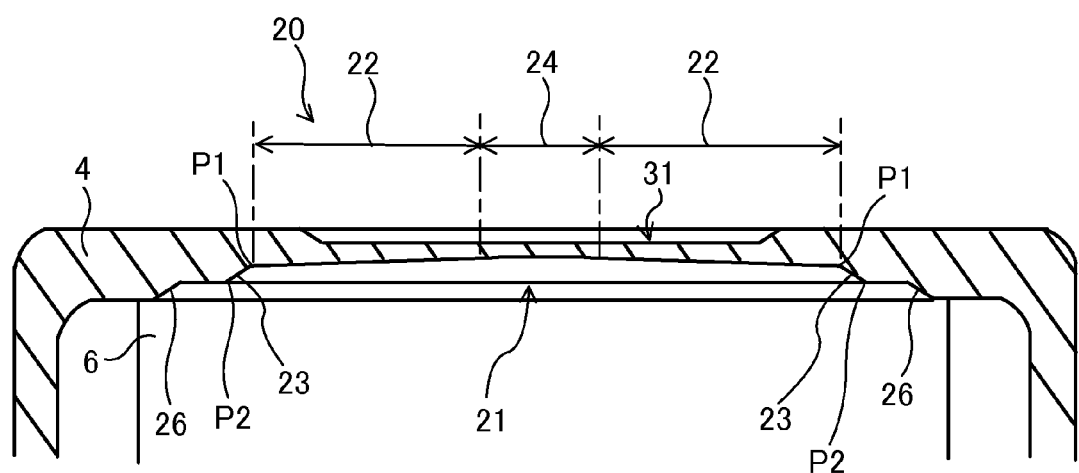
FIG. 7 is an enlarged cross-sectional view showing a configuration of a recessed part in another embodiment of the present invention.

In the above-described embodiment, as shown in FIG. 2 (a) and FIG. 2 (b), the case where the recessed part 21 having the one step portion with the steep second inclined surface 23 is formed in the inner bottom of the metal case 4 is described. However, the present invention is not limited thereto. For example, as shown in FIG. 7, another steep inclined surface 26 may be additionally formed and a recessed part having two-step portion with the inclined surface 23 and the 26 may be configured. Furthermore, the number of steps is not limited thereto and may be three or more.

Figure 8:
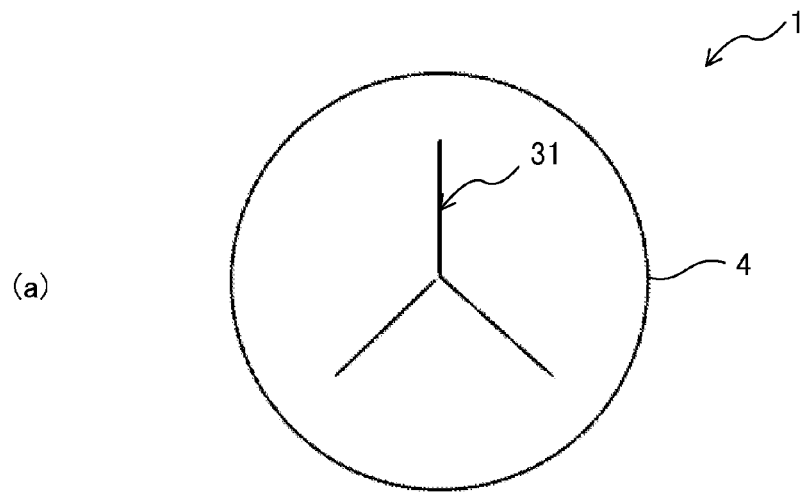
FIG. 8 (a), FIG. 8 (b), and FIG. 8 (c) are plan views each showing a configuration of a groove part in another embodiment of the present invention.
Figure 8:
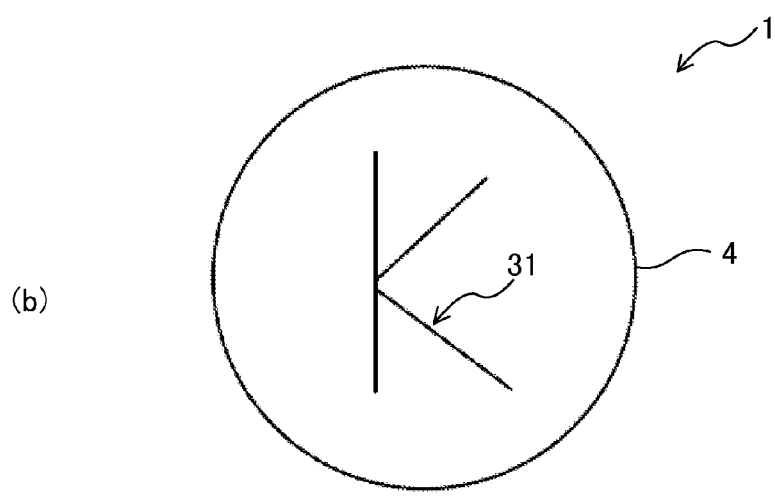
Figure 8:
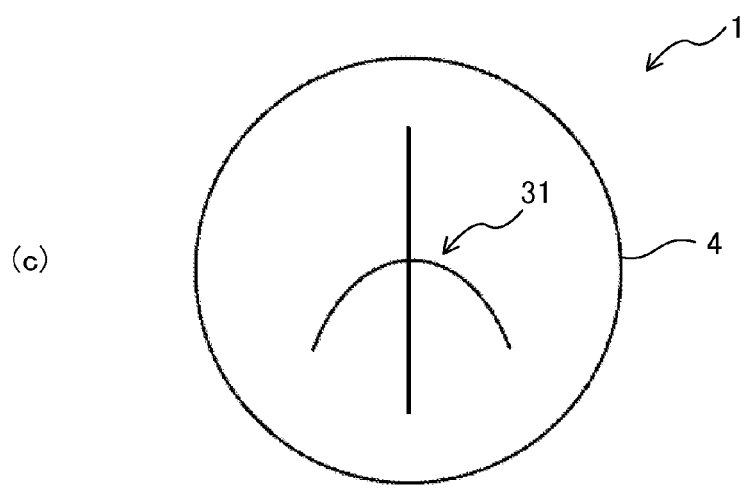

In addition, the above-described embodiment, the case where the cruciform groove part 31 is formed is described. However, the present invention is not limited thereto. For example, as shown in FIG. 8(a), FIG. 8(b), and FIG. 8(c), it is only required for the weak portion to be disposed in the substantially central portion of the bottom of the metal case 4, and a groove part 31 having each of a variety of shapes may be adopted.

Examples

Hereinafter, with reference to examples, the present invention will be further specifically described.

First, with respect to the metal case 4 (one-step shape shown in FIG. 2 (a) and FIG. 2 (b)) and the metal case 4 having the recessed part with the two-step shape shown in FIG. 7, which are described in the above embodiment, and the metal case having the conventional shape with no recessed part 21 being formed, a hydraulic test was conducted.

In the hydraulic test, with respect to a metal case of each of an example shape (example (one-step)) in which the pressure valve 20 having the groove part 31 and the recessed part 21 with the one-step shape (FIG. 2 (a) and FIG. 2 (b)) is provided, an example shape (example (two-step)) in which the pressure valve 20 having the groove part 31 and the recessed part 21 with the two-step shape (FIG. 7) is provided, and the conventional shape (conventional example) in which the pressure valve constituted of only the groove part 31 is provided, a working pressure and a height of the deformation upon the operation (upon the opening) of each of the pressure valves were measured. A result of the measurement is shown in Table 1.

TABLE 1

| | Working pressure (kgf/cm$^2$) | Height of deformation (mm) |
| --- | --- | --- |
| Conventional example | 9.5 | 1.92 |
| Example (one-step) | 9.5 | 1.26 |
| Example (two-step) | 9.5 | 1.23 |

The following is seen from Table 1. In the metal case 4 according to each of the embodiments of the present invention, as compared with that of the conventional shape, it was made possible to suppress the height of deformation of the bottom of the metal case 4 related to the abrupt deformation caused by the hydraulic pressure while the valve working pressure was the same as that of the conventional shape.

Next, with respect to the metal case 4 (one-step shape shown in FIG. 2 (*a*) and FIG. 2 (*b*)) and the metal case 4 having the recessed part with the two-step shape shown in FIG. 7, which are described in the above embodiment and the metal case having the conventional shape with no recessed part 21 being formed, a reliability test was conducted.

In the reliability test, with respect to a metal case of each of an example shape (example (one-step)) in which the pressure valve 20 having the groove part 31 and the recessed part 21 with the one-step shape (FIG. 2 (*a*) and FIG. 2 (*b*)) is provided, an example shape (example (two-step)) in which the pressure valve 20 having the groove part 31 and the recessed part 21 with the two-step shape (FIG. 7) is provided, and the conventional shape (conventional example) in which the pressure valve constituted of only the groove part 31 is provided, the reliability test by the application of a ripple current was conducted for 2000 hours and a height of deformation of each of the pressure valves was measured. A result of the measurement is shown in Table 2.

TABLE 2

|  | Height of deformation (mm) |
|---|---|
| Conventional example | 2.03 |
| Example (one-step) | 1.15 |
| Example (two-step) | 1.22 |

The following is seen from Table 2. In the metal case 4 according to each of the embodiments of the present invention, as compared with that of the conventional shape, it was made possible to suppress the height of deformation of the bottom of the metal case 4 related to the gradual deformation caused by the long-term reliability test while the valve working pressure was the same as that of the conventional shape.

Next, with respect to a case where a diameter of the flat part 24 (FIG. 2 (*b*)) provided in the central part area of the inner bottom of the metal case 4 is 10% of the internal diameter of the metal case 4, which is within the range of 3% to 28%, a case where a diameter of the flat part 24 (FIG. 2 (*b*)) provided in the central part area of the inner bottom of the metal case 4 is 1% of the internal diameter of the metal case 4, which is out of the range of 3% to 28%, and a case where a diameter of the flat part 24 (FIG. 2 (*b*)) provided in the central part area of the inner bottom of the metal case 4 is 35% of the internal diameter of the metal case 4, which is out of the range of 3% to 28%, a working pressure of each of the pressure valves and a height of deformation of each of the pressure valves upon the measurement result was obtained. A result of the measurement is shown in Table 3.

TABLE 3

| | Ratio of a diameter of a flat part to an internal diameter of a metal case (%) | Variation (Standard deviation) | |
|---|---|---|---|
| | | Working pressure | Deformation amount |
| Example | 1 | 1.89 | 1.97 |
| Example | 10 | 0.82 | 0.92 |
| Example | 35 | 2.14 | 2.55 |

The following is seen from Table 3. In the case where the diameter of the flat part 24 (FIG. 2 (*b*)) provided in the central part area of the inner bottom of the metal case 4 was 10% of the internal diameter of the metal case 4 which was within the range of 3% to 28%, as compared with the cases where the diameters of the flat parts 24 (FIG. 2 (*b*)) provided in the central part areas of the inner bottoms of the metal cases 4 were out of the range of 3% to 28%, it was made possible to reduce the variation in the working pressure and the amount of deformation.

Next, with respect to a case where an inclination angle of the first inclined surface 22 with respect to a horizontal plane in FIG. 2 (*b*) is 1.0°, which is in a range of 0.5° to 2.0°, a case where an inclination angle of the first inclined surface 22 with respect to the horizontal plane in FIG. 2 (*b*) is 0.1°, which is out of the range of 0.5° to 2.0°, and a case where an inclination angle of the first inclined surface 22 with respect to the horizontal plane in FIG. 2 (*b*) is 3.0°, which is out of the range of 0.5° to 2.0°, a working pressure of each of the pressure valves and a height of deformation of each of the pressure valves upon the operation (upon the opening) were measured and a standard deviation of the measurement result was obtained. A result of the measurement is shown in Table 4.

TABLE 4

| | Inclination angle of a first inclined surface with respect to a horizontal plane of a metal case (°) | Variation (Standard deviation) | |
|---|---|---|---|
| | | Working pressure | Deformation amount |
| Example | 0.1 | 1.59 | 1.57 |
| Example | 1.0 | 0.92 | 0.93 |
| Example | 3.0 | 1.54 | 1.77 |

The following is seen from Table 4. In the case where the inclination angle of the first inclined surface 22 with respect to the horizontal plane in FIG. 2 (*b*) was 1.0°, which is in the range of 0.5° to 2.0°, as compared with the cases where the inclination angles of the first inclined surfaces 22 with respect to the horizontal plane in FIG. 2 (*b*) were out of the range of 0.5° to 2.0°, it was made possible to reduce the variation in the working pressure and the amount of deformation.

Next, with respect to a case where a length L11 (FIG. 2 (*b*)) of an edge portion of the inner bottom of the metal case 4 accounts for 20% of a diameter of the metal case 4, which is in a range of 11% to 29%, a case where the length L11 (FIG. 2 (*b*)) of the edge portion of the inner bottom of the metal case 4 accounts for 5% of the diameter of the metal case 4, which is out of the range of 11% to 29%, and a case where the length L11 (FIG. 2 (*b*)) of the edge portion of the inner bottom of the metal case 4 accounts for 35% of the diameter of the metal case 4, which is out of the range of 11% to 29%, a working pressure of the pressure valve and a height of deformation upon the operation (upon the opening) were measured and a standard deviation of the measurement result was obtained. A result of the measurement is shown in Table 5.

TABLE 5

| Ratio of a length of an edge portion of an inner bottom of a metal case to a diameter of the metal case (%) | Variation (Standard deviation) | |
|---|---|---|
| | Working pressure | Deformation amount |
| Example 5 | 1.69 | 1.87 |
| Example 20 | 0.85 | 0.91 |
| Example 35 | 1.83 | 1.87 |

The following is seen from Table 5. In the case where the length L11 (FIG. 2 (b)) of the edge portion of the inner bottom of the metal case 4 accounts for 20% of the diameter of the metal case 4, which is within the range of 11% to 29%, as compared with the cases where the lengths L11 (FIG. 2 (b)) of the edge portions of the inner bottoms of the metal cases 4 account for the percentages, which are out of the range of 11% to 29%, it was made possible to reduce the variation in the working pressure and the amount of deformation.

Next, with respect to a case where regardless of a size of the metal case 4, a thickness T11 of a thick-wall portion of the inner bottom of the metal case 4 is 0.7 mm, which is in a range of 0.5 mm to 1.0 mm, a case where regardless of the size of the metal case 4, a thickness T11 of the thick-wall portion of the inner bottom of the metal case 4 is 0.2 mm, which is out of the range of 0.5 mm to 1.0 mm, and a case where regardless of the size of the metal case 4, a thickness T11 of the thick-wall portion of the inner bottom of the metal case 4 is 1.5 mm, which is out of the range of 0.5 mm to 1.0 mm, a working pressure of the pressure valve and a height of deformation upon the operation (upon the opening) were measured and a standard deviation of the measurement result was obtained. A result of the measurement is shown in Table 6.

TABLE 6

| Thickness of a thick-wall portion of an inner bottom of a metal case (mm) | Variation (Standard deviation) | |
|---|---|---|
| | Working pressure | Deformation amount |
| Example 0.2 | 1.77 | 1.81 |
| Example 0.7 | 0.88 | 0.95 |
| Example 1.5 | 1.91 | 1.93 |

The following is seen from Table 6. In the case where regardless of the size of the metal case 4, the thickness T11 of the thick-wall portion of the inner bottom of the metal case 4 is 0.7 mm which is in the range of 0.5 mm to 1.0 mm, as compared with the cases where thicknesses T11 of the thick-wall portions of the inner bottoms of the metal cases 4 are out of the range of 0.5 mm to 1.0 mm, it was made possible to reduce the variation in the working pressure and the amount of deformation.

In the above-described embodiment, the description related to the electrolytic capacitor is given. However, needless to say, even when the present invention is used for an exterior case of an electric double-layer capacitor, the same effects can be attained.

In addition, in the above-described embodiment, the description related to the case where the recessed part having the step portion of the one-step with the steep second inclined surface is formed in the inner bottom of the metal case is given. However, for example, by additionally forming a steeply inclined surface, a recessed part having a two-step shape may be configured. Further, the number of steps is not limited thereto and may be three or more.

Furthermore, in the above-described embodiment, the description related to the case where the cruciform groove part is formed is given. However, for example, it is only required for the weak portion to be disposed in the substantially central portion of the bottom of the metal case, and a groove part having each of a variety of shapes may be adopted.

REFERENCE SIGNS LIST 1 capacitor
2 opening sealing terminal plate (opening sealing body)
3 lead tab
4 metal case (exterior case)
5 winding stopper tape
6 capacitor element
7 cathode foil
8 anode foil
9 electrolytic paper (separator)
11 terminal
20 pressure valve
21 recessed part
22 first inclined surface
23 second inclined surface
24 flat part
31 groove part
P1, P2 inflection point

The invention claimed is:

1. A capacitor comprising:
a capacitor element being formed by overlaying and winding a anode foil and a cathode foil with a separator interposed between the anode foil and the cathode foil and by being impregnated with an electrolytic solution;
an exterior case for housing the capacitor element, the exterior case having a cylindrical shape with a bottom; and
an opening sealing body for sealing an opening of the exterior case,
a recessed part being formed on an inner bottom of the exterior case, the recessed part having: a first inclined surface radially expanding from a central part area of the inner bottom, the central part area of the inner bottom being the deepest portion of the inner bottom; and a second inclined surface continuing from an outer edge of the first inclined surface, the second inclined surface being steeper than the first inclined surface,
a weak portion being formed inside of the recessed part,
a groove part being formed outside of the inner bottom of the exterior case,
a thick-wall portion having a flat surface being formed from an outer edge of the second inclined surface, the flat surface being in contact with an outer edge portion of a surface of the capacitor element facing the inner bottom of the exterior case,
wherein the surface of the capacitor element facing the inner bottom of the exterior case is not in contact with the recessed part so as to form a space therebetween.

2. The capacitor according to claim 1, wherein in the deepest portion, a flat part having a diameter within a range of 3% to 28% of an internal diameter of the exterior case is provided.

3. The capacitor according to claim 2, wherein an inclination angle of the first inclined surface is an angle within a range of 0.5° to 2.0° with respect to a horizontal plane on which the inner bottom is arranged.

4. The capacitor according to claim 3, wherein a length of an edge portion of the inner bottom of the exterior case is a length within a range of 11% to 29% of a diameter of the exterior case.

5. The capacitor according to claim 4, wherein a thickness of a thick-wall portion of the inner bottom of the exterior case is a thickness within a range of 0.5 mm to 1.0 mm.

6. The capacitor according to claim 3, wherein a thickness of a thick-wall portion of the inner bottom of the exterior case is a thickness within a range of 0.5 mm to 1.0 mm.

7. The capacitor according to claim 2, wherein a length of an edge portion of the inner bottom of the exterior case is a length within a range of 11% to 29% of a diameter of the exterior case.

8. The capacitor according to claim 7, wherein a thickness of a thick-wall portion of the inner bottom of the exterior case is a thickness within a range of 0.5 mm to 1.0 mm.

9. The capacitor according to claim 2, wherein a thickness of a thick-wall portion of the inner bottom of the exterior case is a thickness within a range of 0.5 mm to 1.0 mm.

10. The capacitor according to claim 1, wherein an inclination angle of the first inclined surface is an angle within a range of 0.5° to 2.0° with respect to a horizontal plane on which the inner bottom is arranged.

11. The capacitor according to claim 10, wherein a length of an edge portion of the inner bottom of the exterior case is a length within a range of 11% to 29% of a diameter of the exterior case.

12. The capacitor according to claim 11, wherein a thickness of a thick-wall portion of the inner bottom of the exterior case is a thickness within a range of 0.5 mm to 1.0 mm.

13. The capacitor according to claim 10, wherein a thickness of a thick-wall portion of the inner bottom of the exterior case is a thickness within a range of 0.5 mm to 1.0 mm.

14. The capacitor according to claim 1, wherein a length of an edge portion of the inner bottom of the exterior case is a length within a range of 11% to 29% of a diameter of the exterior case.

15. The capacitor according to claim 14, wherein a thickness of a thick-wall portion of the inner bottom of the exterior case is a thickness within a range of 0.5 mm to 1.0 mm.

16. The capacitor according to claim 1, wherein a thickness of a thick-wall portion of the inner bottom of the exterior case is a thickness within a range of 0.5 mm to 1.0 mm.

* * * * *